United States Patent
DiFoggio et al.

(10) Patent No.: US 9,097,097 B2
(45) Date of Patent: Aug. 4, 2015

(54) METHOD OF DETERMINATION OF FRACTURE EXTENT

(71) Applicant: Baker Hughes Incorporated, Houston, TX (US)

(72) Inventors: Rocco DiFoggio, Houston, TX (US); Anthony A. DiGiovanni, Houston, TX (US); Avi Hetz, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 206 days.

(21) Appl. No.: 13/847,962

(22) Filed: Mar. 20, 2013

(65) Prior Publication Data

US 2014/0284049 A1    Sep. 25, 2014

(51) Int. Cl.
| | |
|---|---|
| E21B 43/267 | (2006.01) |
| E21B 47/00 | (2012.01) |
| G01V 3/26 | (2006.01) |
| G01V 1/40 | (2006.01) |
| G01V 11/00 | (2006.01) |

(52) U.S. Cl.
CPC ............... *E21B 47/00* (2013.01); *E21B 43/267* (2013.01); *G01V 3/26* (2013.01); *G01V 1/40* (2013.01); *G01V 11/007* (2013.01); *G01V 2210/1234* (2013.01)

(58) Field of Classification Search
CPC .............................. E21B 43/26; E21B 43/267
See application file for complete search history.

(56) References Cited

U.S. PATENT DOCUMENTS

| | | |
|---|---|---|
| 1,819,923 A | 8/1931 | Schlumberger |
| 1,913,293 A | 6/1933 | Schlumberger |
| 3,012,893 A | 12/1961 | Kremzner et al. |
| 3,985,909 A | 10/1976 | Kirkpatrick |
| 4,289,794 A | 9/1981 | Kleiner et al. |

(Continued)

FOREIGN PATENT DOCUMENTS

| | | |
|---|---|---|
| WO | 8402838 | 8/1984 |
| WO | 2009032996 A2 | 3/2009 |
| WO | 2009047781 A2 | 4/2009 |

OTHER PUBLICATIONS

Brennan, Christopher Earls, "Cavitation and Bubble Dynamics", Oxford University Press 1995, ISBN 0-19-509409-3, http://caltechbook.library.caltech.edu/archive/OOOOOOO 1/00/bubble.htm, 254 pages.

(Continued)

*Primary Examiner* — William P Neuder
(74) *Attorney, Agent, or Firm* — Steve Rosenblatt

(57) ABSTRACT

A pressure pulse is initiated from the wellbore into the fractured formation where the frac fluid brings into the fractures a material that is responsive to the pressure pulse alone. Alternatively, or with a combination with a wellbore pressure pulse, well conditions such as time exposure and temperature can initiate local pressure pulses within the fracture with the result being signal generation of an electromagnetic signal that is measured with multiple sensors to allow triangulation of the location of the fracture extremities. The material can be a piezoelectric material that responds to the pressure pulse or ferromagnetic materials that similarly respond to the pulse to create the measured signals. The material can be delivered initially with the frac fluid or at different points in time during the fracture operation. Different materials with unique signal generating characteristics can be used to get a clearer picture of the extent of the fracture.

19 Claims, 3 Drawing Sheets

(56) References Cited

U.S. PATENT DOCUMENTS

| | | | |
|---|---|---|---|
| 4,567,945 A | 2/1986 | Segalman |
| 4,705,108 A | 11/1987 | Little et al. |
| 4,744,245 A | 5/1988 | White |
| 5,010,527 A | 4/1991 | Mahrer |
| 5,398,756 A | 3/1995 | Brodsky et al. |
| 5,574,218 A | 11/1996 | Withers |
| 5,603,971 A | 2/1997 | Porzio et al. |
| 5,756,136 A | 5/1998 | Black et al. |
| 5,917,160 A | 6/1999 | Bailey |
| 5,929,437 A | 7/1999 | Elliott et al. |
| 6,148,911 A | 11/2000 | Gipson et al. |
| 6,187,351 B1 | 2/2001 | Porzio et al. |
| 6,190,526 B1 | 2/2001 | Ho |
| 6,371,917 B1 | 4/2002 | Ferrara et al. |
| 6,394,184 B2 | 5/2002 | Tolman et al. |
| 6,520,255 B2 | 2/2003 | Tolman et al. |
| 6,562,256 B1 | 5/2003 | Fleming et al. |
| 6,652,895 B2 | 11/2003 | Porzio et al. |
| 6,789,621 B2 | 9/2004 | Wetzel et al. |
| 6,837,310 B2 | 1/2005 | Martin |
| 6,840,318 B2 | 1/2005 | Lee et al. |
| 6,957,701 B2 | 10/2005 | Tolman et al. |
| 7,073,581 B2 | 7/2006 | Nguyen et al. |
| 7,134,491 B2 | 11/2006 | Kohli et al. |
| 7,134,492 B2 | 11/2006 | Willberg et al. |
| 7,331,385 B2 | 2/2008 | Symington et al. |
| 7,387,161 B2 | 6/2008 | Abass et al. |
| 7,413,010 B2 | 8/2008 | Blauch et al. |
| 7,424,911 B2 | 9/2008 | McCarthy et al. |
| 7,451,812 B2 | 11/2008 | Cooper et al. |
| 7,491,444 B2 | 2/2009 | Smith et al. |
| 7,544,643 B2 | 6/2009 | Huang |
| 7,604,054 B2 | 10/2009 | Hocking |
| 7,631,691 B2 | 12/2009 | Symington et al. |
| 7,654,323 B2 | 2/2010 | Alary et al. |
| 7,660,673 B2 | 2/2010 | Dozier |
| 7,703,531 B2 | 4/2010 | Huang et al. |
| 7,712,525 B2 | 5/2010 | Abass et al. |
| 7,723,272 B2 | 5/2010 | Crews et al. |
| 7,803,740 B2 | 9/2010 | Bicerano et al. |
| 7,803,741 B2 | 9/2010 | Bicerano et al. |
| 7,803,742 B2 | 9/2010 | Bicerano et al. |
| 7,845,413 B2 | 12/2010 | Shampine et al. |
| 7,867,613 B2 | 1/2011 | Smith et al. |
| 7,870,904 B2 | 1/2011 | Hocking |
| 7,902,125 B2 | 3/2011 | Bicerano et al. |
| 7,926,562 B2 | 4/2011 | Poitzsch et al. |
| 8,006,754 B2 | 8/2011 | Bicerano |
| 8,006,755 B2 | 8/2011 | Bicerano |
| 8,088,718 B2 | 1/2012 | Bicerano et al. |
| 8,100,177 B2 | 1/2012 | Smith, Jr. et al. |
| 8,168,570 B2 | 5/2012 | Barron et al. |
| 8,215,393 B2 | 7/2012 | Mackay et al. |
| 8,220,543 B2 | 7/2012 | Clark et al. |
| 8,227,026 B2 | 7/2012 | McDaniel et al. |
| 8,230,923 B2 | 7/2012 | Huang et al. |
| 8,258,083 B2 | 9/2012 | Bicerano |
| 8,269,648 B2 | 9/2012 | Benischek et al. |
| 8,278,373 B2 | 10/2012 | Bicerano et al. |
| 2005/0272611 A1 | 12/2005 | Lord et al. |
| 2007/0106006 A1 | 5/2007 | Cooper et al. |
| 2007/0161515 A1 | 7/2007 | Bicerano |
| 2007/0256830 A1* | 11/2007 | Entov et al. ............... 166/250.1 |
| 2008/0125335 A1 | 5/2008 | Bhavsar |
| 2008/0208054 A1 | 8/2008 | Azuma et al. |
| 2009/0125240 A1 | 5/2009 | Den Boer et al. |
| 2009/0157322 A1 | 6/2009 | Levin |
| 2009/0179649 A1 | 7/2009 | Schmidt et al. |
| 2009/0211754 A1 | 8/2009 | Verret et al. |
| 2009/0250216 A1 | 10/2009 | Bicerano |
| 2010/0038083 A1 | 2/2010 | Bicerano |
| 2010/0158816 A1 | 6/2010 | Kawabata et al. |
| 2011/0188347 A1 | 8/2011 | Thiercelin et al. |
| 2012/0031613 A1 | 2/2012 | Green |
| 2014/0190686 A1* | 7/2014 | Cannan et al. ........... 166/250.01 |

OTHER PUBLICATIONS

Nano Resbots: Navigating the Reservoirs of Tomorrow, Saudi Aramco, Mar. 6, 2008, http://www.rigzone.com/news/article.asp?a_id=57957, 2 pages.

Gerhard Von Der Emde et al., "Electric fish measure distance in the dark", Nature, Oct. 29, 1998, vol. 395, pp. 890-894.

James R. Solberg et al., "Robotic Electrolocation: Active Underwater Target Localization with Electric Fields", Proceedings of the 2007 International Conference of Robotics and Automation (ICRA), Apr. 10-14, 2007, Rome, Italy.

James R. Solberg et al., "Active Electrolocation for Underwater Target Localization", The International Journal of Robotics Research, May 2008, vol. 27, No. 5, pp. 529-548.

Mark Halper, Global Business: Norway's Power Push. Is osmosis the answer to the world's energy shortage? Why the "salient gradient" holds promise, TIME, Dec. 13, 2010, Pages Global 1-2, vol. 176.

EPA Hydraulic Fracturing Technical Workshop #3 Fate and Transport; "Characterizing Mechanical and Flow Properties Using Injection Falloff Tests", Mar. 28, 2011; 24pp.

Kumar, S, et al., "A study of pressure pulses generated by travelling bubble cavitation" J. Fluid Mech., 1993, 541-564.

Shkuratov, Serge I., et al., Longitudinal Shock Wave Depolarization fo Pb(Zr52Ti48)03 Polycrystalline Ferroelectrics and Their Utilization in Explosive Pulsed Power, American Institute of Physics, 2006, 1169-1172.

Underwater Acoustics: Noise and the Effects on Marine Mammals, A Pocket Handbook 3rd Edition; 2009, 35 pp.

Johnson, Jerome; "Theoretical and Experimental Analysis of the Ferromagnetic Explosively Shocked Current Pulse Generator" Journal of Applied Physics, 30:4, Apr. 1959, 241-245.

National Technical Information Service U.S. Department of Commerce; Proceeding of the Workshop on Low-Frequency Sound Sources, Nov. 5-7, 1973, Office of Naval Research, Sep. 1974, 283pp.

Pulli, Jay J., et al., "Hydroacoustic Calibration with Imploding Glass Spheres", BBN Technologies; U.S. DOE, Sep. 2000, 11pp.

Deane, Grant B., "Sound generation and air entrainment by breaking waves in the surf zone", J. Acoust. Soc. Am. 102:5, Nov. 1997.

Reactions of the Group[ 1 Elements with Water; http://www.chemguide.co.us/inorganic/group1/reacth2o.html; date unknown, 8pp.

Common Water Reactive Chemicals, date unknown, 1p.

3M™ Glass Bubbles for Low Density Drilling Fluids, http://solutions.3m.com/wps/portal/3M/en_US/Oil-Gas/Home/Solutions/Exploration-Production/Glass_Bubbles-Drilling_Fluids/, date unknown, 1p.

* cited by examiner

METHOD OF DETERMINATION OF FRACTURE EXTENT

FIELD OF THE INVENTION

The field of the invention is methods to determine the extent of fracture propagation from a borehole and more particularly creating a measurable signal that originates within the fracture by using a pressure wave to create an electromagnetic signal that is detected by surrounding sensors so as to triangulate the positions of the electromagnetic emissions and thereby the extent of the fracture.

BACKGROUND OF THE INVENTION

Fracturing entails pumping large volumes of high pressure water and chemicals into a formation to initiate and propagate fractures emanating from a borehole. The proppants that are used are intended to lodge in the fractures to hold them open to facilitate subsequent production from that borehole or adjacent boreholes to the surface. While the volumes of the pumped fluid and the pressure at which such fluid is delivered can be measured, it is at best an indirect approximation of the fracture network that has been created in part because the width of the fracture is unknown and variable so that knowing the fracture volume does not allow one to estimate its area.

To gain further knowledge of the extent of the fracture network acoustic techniques have been suggested where the signal is generated from implosion of voids or explosions in a material delivered with the frac fluid. Some relevant background for such acoustic techniques is: US Publication 2009/0125240 USING MICROSEISMIC DATA TO CHARACTERIZE HYDRAULIC FRACTURES, SCHLUMBERGER; US Publication 2011/0188347 VOLUME IMAGING FOR HYDRAULIC FRACTURE CHARACTERIZATION, SCHLUMBERGER; U.S. Pat. No. 6,488,116 Acoustic receiver, Exxon; U.S. Pat. No. 5,963,508 System and method for determining earth fracture propagation, Atlantic Richfield Company; U.S. Pat. No. 5,917,160 Single well system for mapping sources of acoustic energy, Exxon; U.S. Pat. No. 5,574,218 Determining the length and azimuth of fractures in earth formations, Atlantic Richfield Company; U.S. Pat. No. 5,010,527 Method for determining the depth of a hydraulic fracture zone in the earth, Gas Research Institute; U.S. Pat. No. 4,744,245 Acoustic measurements in rock formations for determining fracture orientation, Atlantic Richfield Company; U.S. Pat. No. 6,840,318 Method for Treating a Subterranean Formation (Enteric Coatings for Treatments), Schlumberger; 1993 Kumar—Bubble Cavitation Power Spectrum FIG. 18; 2000 Pulli & Harben—Imploding (Macroscopic) Glass Spheres FIG. 6 Freq Distribution to 5 Hz Plasma (sparker) sound source mostly 20-200 Hz; Jasco Pocket Book 3rd ed. Underwater Reference & Freq v. Source Air gun Freq Spectrum FIG. 8; 1997 Deanne—Sound generation by bubbles and waves in ocean FIG. 17a Spectral Density.pdf 1993 Cook—Spark Generated Bubbles Power Spectrum p 127; 1974 Underwater Low Frequency Sound Sources Air Gun FIG. 30p 75 Acoustic Frequency Distribution & p 79 Low Freq Cutoffs of Dif Sources.

The present invention addresses a different technique for signal generation that results in a measurable signal, preferably electromagnetic, that is triggered with preferably a pressure pulse using explosive material or other means of generated pressure energy to create the desired signal. In one embodiment the pressure pulse acts on piezoelectric materials to cause an array of measured signals. These and other aspects of the present invention will be more readily apparent from the detailed description and the associated drawing of the preferred embodiment while understanding that the full scope of the invention is to be determined from the appended claims.

SUMMARY OF THE INVENTION

A pressure pulse is initiated from the wellbore into the fractured formation where the frac fluid brings into the fractures a material that is responsive to the pressure pulse alone. Alternatively, or with a combination with a wellbore pressure pulse, well conditions such as time exposure and temperature can initiate local pressure pulses within the fracture with the result being signal generation of an electromagnetic signal that is measured with multiple sensors to allow triangulation of the location of the fracture extremities. The material can be a piezoelectric material that responds to the pressure pulse or ferromagnetic materials that similarly respond to the pulse to create the measured signals. The material can be delivered initially with the frac fluid or at different points in time during the fracture operation. Different materials with unique signal generating characteristics can be used to get a clearer picture of the extent of the fracture.

BRIEF DESCRIPTION OF THE DRAWINGS

FIG. 4b is alternate embodiment of FIG. 4a.

DETAILED DESCRIPTION

Figure 3:
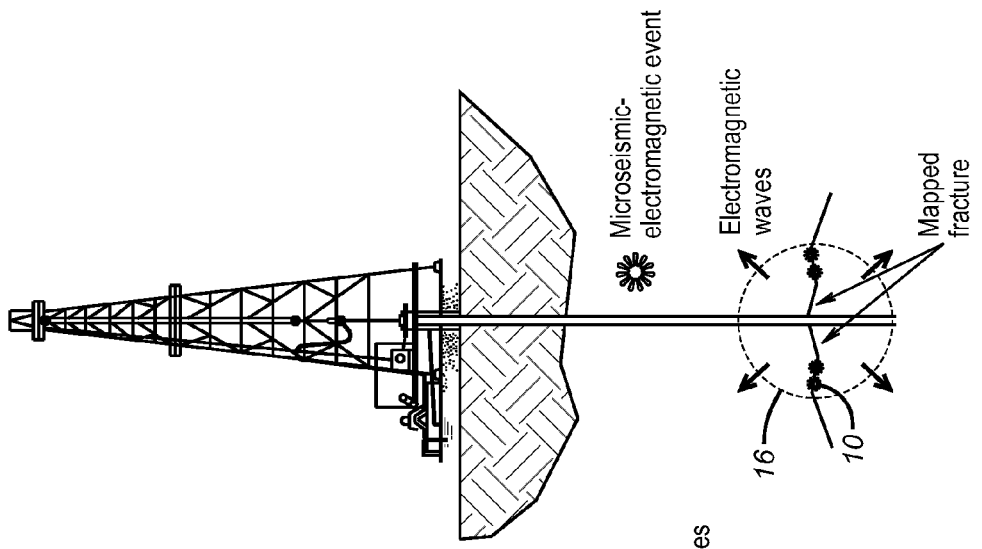
FIG. 3 shows the electromagnetic signal being generated.
Figure 2:
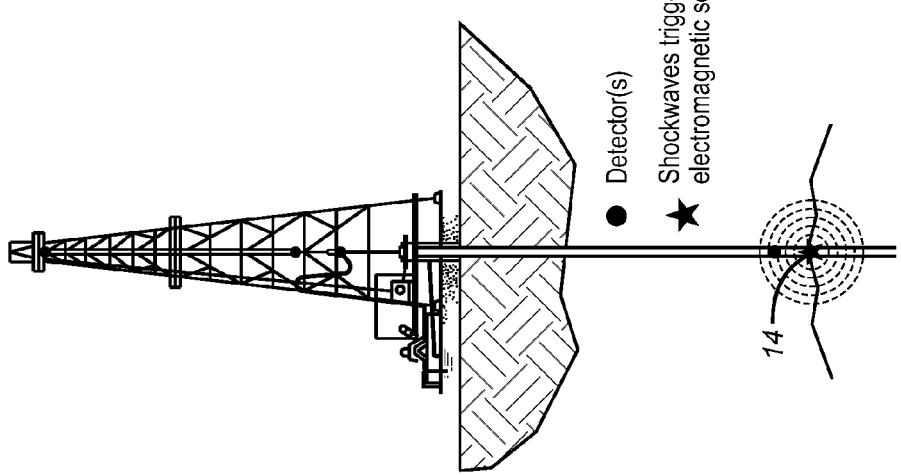
FIG. 2 is the view of FIG. 1 showing the initiation of the shock wave.
Figure 1:
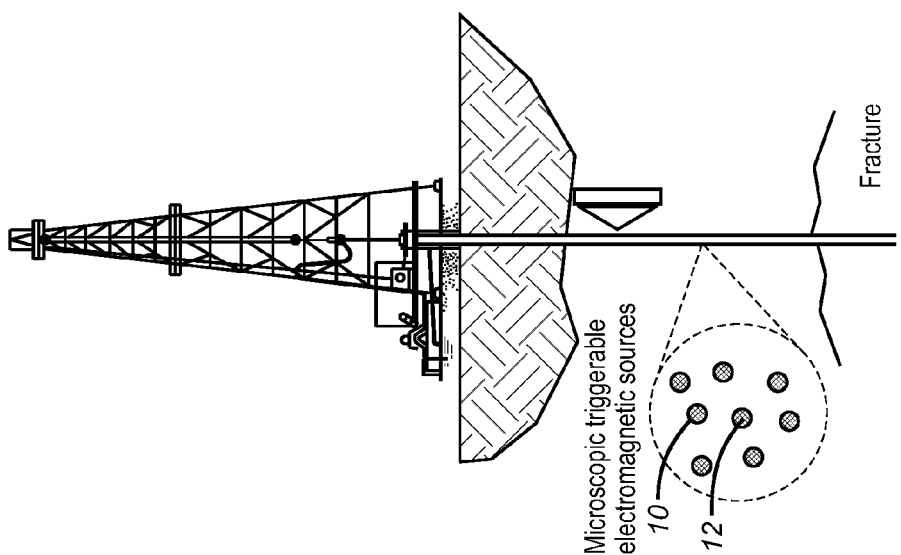
FIG. 1 shows the signal generating particles being delivered to create the fracture.
Figure 4A:
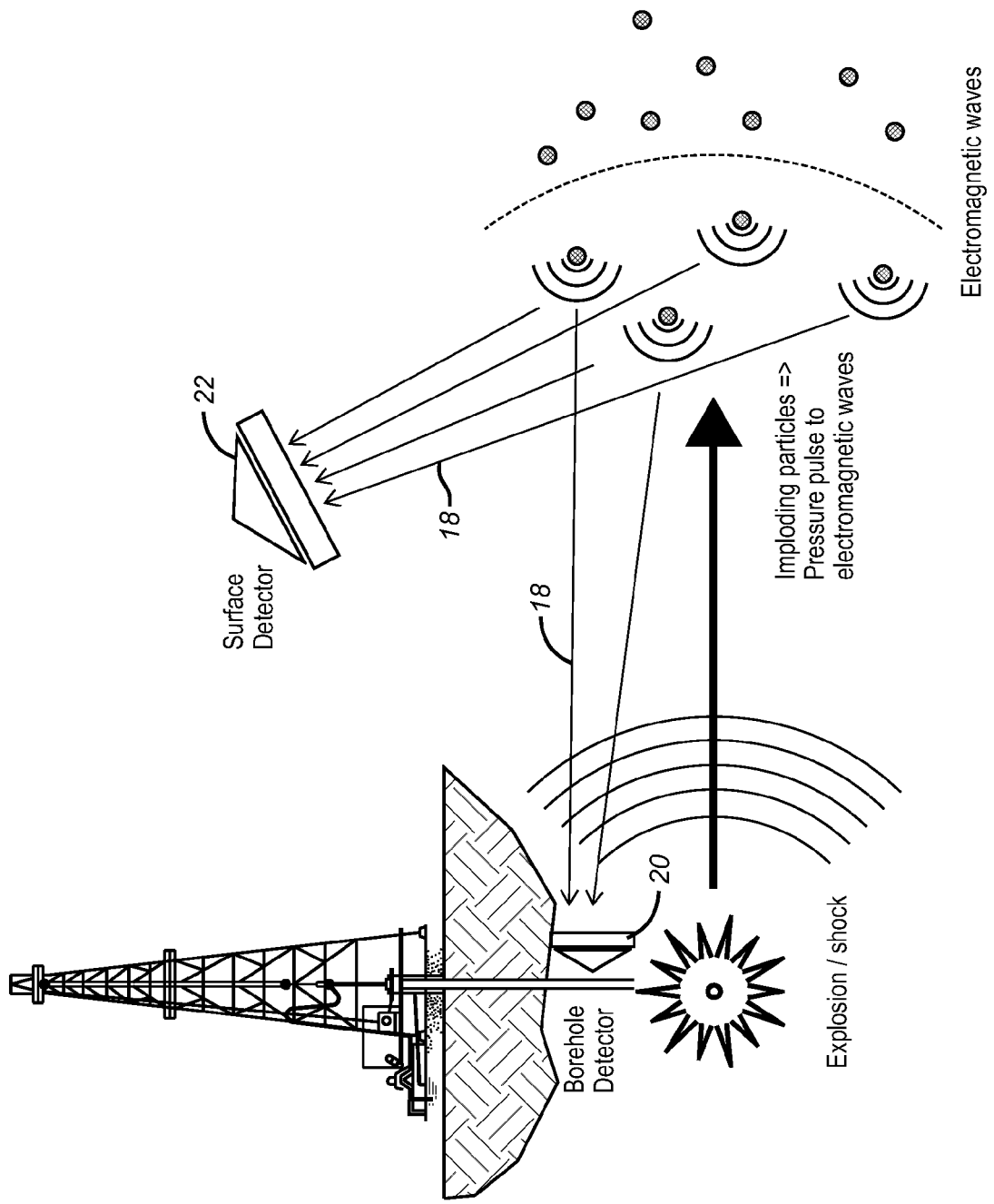
FIG. 4a shows the sensing of the signal(s) at the borehole and surface locations.
Figure 4B:
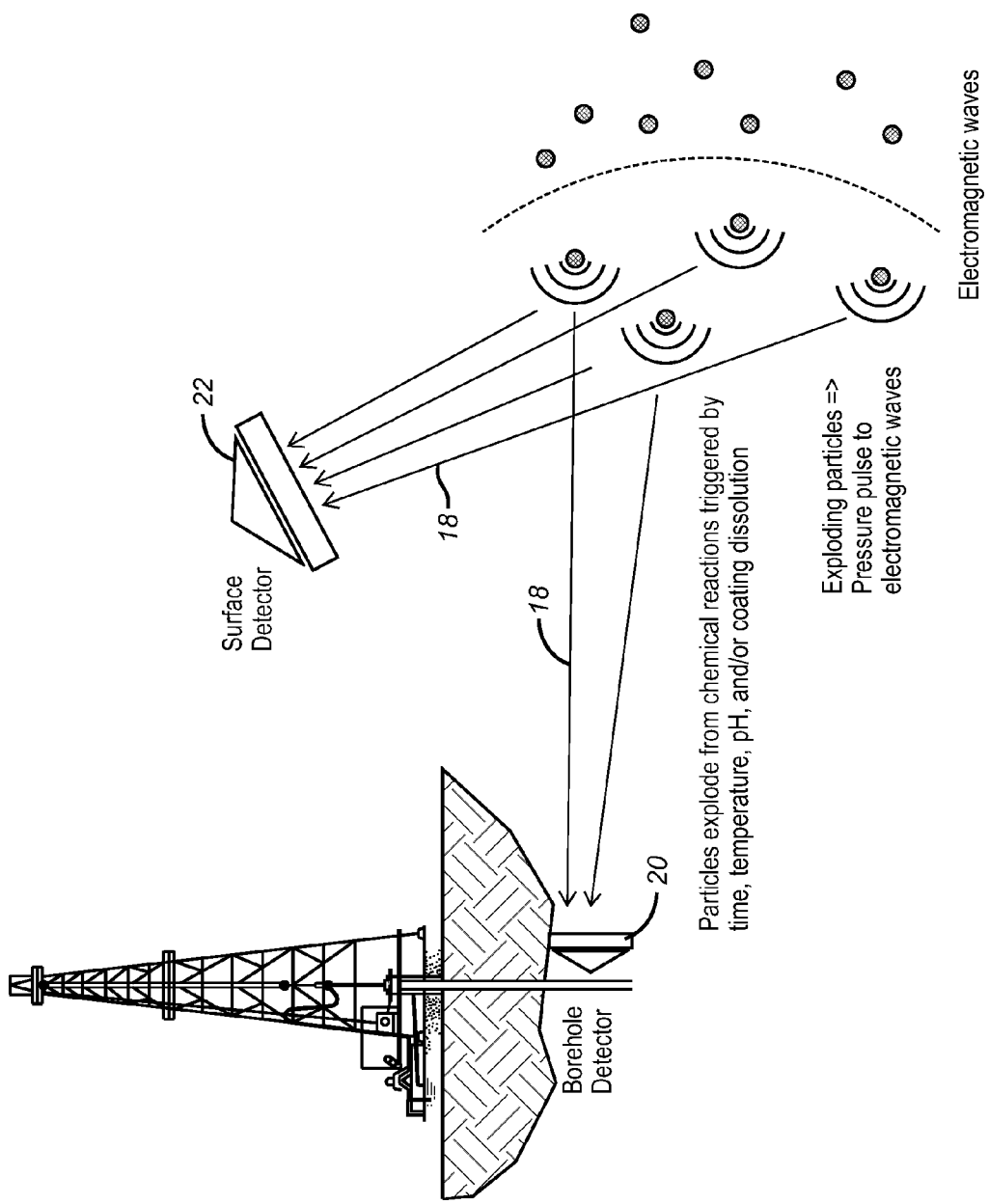

At the beginning of the fracturing process (or, perhaps, even at one or more later times), a slug of microscopic triggerable sources 10 is mixed with the proppants 12 in the fracturing fluid. This initial fluid slug should be the leading fluid that remains in contact with the outer edges of the fracture. Although hydraulic fracturing pressures can reach as high as 10,000 to 15,000 psi, there are 3M glass Microbubbles that can withstand up to 18 000 psi. Using appropriately rated glass spheres (wall thickness and diameter in microns), keeps them intact during the fracturing process. Afterwards, a sudden pressure impulse 14 (such as a ram hitting a pressure piston or an explosive charge) could be used to create a pressure spike 16 that breaks a significant number of the glass spheres in their concentrated region near the fracture's edges. The implosions of the glass spheres mechanically impacts the smaller piezoelectric material 10 within the spheres to initiate an electromagnetic signal 18 that is detected from multiple locations 20 in the borehole and 22 at the surface and triangulated backward to their downhole locations.

Alternatively, time, temperature, pH, (and, perhaps, pressure for permeable coatings) act as triggers of these sources after the fracture has been completed. For example, a thin protective coating that degrades with time, temperature, or pH is placed over a microscopic core of something that chemically reacts very strongly with the fracturing fluid. When using pH as a trigger, enteric coatings are resistant to acids (low pH) but readily dissolve in bases (high pH) and reverse-enteric coatings readily dissolve in acids but not in bases. For example, the Group One metals (Lithium, Sodium, Potassium, Rubidium, and Cesium) all react with water and the reaction intensity increases with molecular weight so the strongest reaction is for Cesium, which explodes upon contact with water and would apply a pressure pulse to the piezoelectric material. Francium can be used but is less advantageous because it is radioactive and it is only available in trace amounts.

A Group Two metal (Strontium) also reacts strongly with water as do various other chemical compounds (Sodium Carbide, Calcium Carbide, Aluminum Chloride, Lithium Hydride, Sodium Peroxide, etc.). Calcium Carbide and Sodium Carbide may be less expensive and more readily available materials as they are sometimes used in emergency flares or by blacksmiths to generate acetylene on demand for welding torches. The choice of degradable coating material and its thickness for the given environment of temperature, pressure, and fracturing fluid, would determine the approximate times at which these degradable protective coatings would be breached and microscopic explosions of these triggerable sources would take place.

Microscopic triggerable electromagnetic (piezoelectric) sources are mixed with ordinary proppants in a fracture fluid during hydraulic fracturing to allow these triggerable sources to be fired when it is believed that the fractures have stopped propagating and, thereby, to determine the extent of the fracture. The trigger can be a pressure pulse that exceeds the hydrostatic pressure rating of hollow glass microspheres (5 to 100 microns in diameter with wall thicknesses about 2 percent of their diameters) and causes them to implode and mechanically excite the smaller piezoelectric material within them and create a spark of many electromagnetic frequencies. Conceptually, it is similar to the sparking piezoelectric igniters used on natural gas appliances. When struck, they produce a spark, which includes a broad range of electromagnetic frequencies, which, like lightning, can often be heard as static on a transistor radio regardless of the radio station to which it is tuned. Alternatively, it could simply the passage of time at temperature which slowly erodes an degradable protective coating over a highly-chemically-reactive core (e.g., Cesium metal, sodium carbide, etc.) that reacts with the fracturing fluid (e.g., water) causing a "pop" upon contact that applies a pressure pulse to a piezoelectric material and generates a corresponding electromagnetic signal from the resulting spark, which includes a broad range of different electromagnetic frequencies. The downhole locations of these triggered micro-electromagnetic sources when they are fired would be determined by in-well or surface electromagnetic detectors at multiple locations and by triangulation.

In a variation of the method the material that receives the pressure pulse can be a ferromagnetic or ferromagnetic material 10' whereby the ferromagnetic or ferromagnetic material under the action of the shock pulse transforms to a paramagnetic material subsequently generating a current and voltage response as described by J. Johnson, "Theoretical and Experimental Analysis of the Ferromagnetic Explosively Shocked Current Pulse Generator," J. Appl. Phys, 30 [4], 1959, pp 241S-243S, the disclosure of which is hereby incorporated herein in its entirety by this reference. It may further be appreciated that the size, shape, and construct of the magnetic material or particle will influence the subsequent I-V response to the shock pulse and therefore correspondingly the measureable signal by which an embodiment of this invention is enabled. Suitable particle morphologies can include simple granular media with monomodal or multimodal distributions or also include layered constructions of one or more materials, elongated particles, hollow spheres or rods, platelets, fibers, and agglomerates thereof. Size range of particles may extend from the nano-scale where the largest physical average dimension measured linearly does is between 1 and 100 nanometers. Additional sizes from 100 nm to 500 nm, 500 nm to 1 micron, 1 micron to 10 microns, and particles or clusters in excess of 10 microns to 1000 microns, or particles and cluster between 1 mm and 10 mm are anticipated. Examples of suitable ferromagnetic or ferromagnetic materials are elemental iron, nickel, cobalt, dysprosium, gadolinium, and alloys of said materials. Also suitable materials include chromium (IV) oxide, gallium manganese arsenide, magnetite, samarium-cobalt, neodymium-cobalt, and similar alloys, yttrium iron garnets, spinels of the form $AB_2O_4$, where A and B represent various metal cations, usually including iron Fe, MnBi, EuO, $CrBr_3$, EuS, $MOFe_2O_3$, and other oxides of iron, cobalt, and nickel. These magnetic materials can be used singly, combined with one or more constituents, and also mixed with a piezoelectric material 10 that in response to the pressure pulse also emits electromagnetic energy that can be measured by sensors in the wellbore or/and at the surface. It can be appreciated that the different materials have different magnetisms and therefore different responses to the shock pressure and therefore the mixture of the materials and the injection sequence into the wellbore would be chosen to maximize the embodiments of the invention. In the downhole application, the sensor placement enables a triangulation technique for allowing the computation of the configuration of the fracture.

Those skilled in the art will appreciate that the pressure pulse can be created in a variety of ways that in turn will allow the generation of signals from the leading fronts of the fracture. Depending on the material used and the timing of when it is pumped into the fracture and its concentration and other variables, the signals that are received at spaced sensors can allow data to be processed that indicates not only the leading fronts of the fractures created but also intermediate data as to the fracture propagation between the borehole and the leading fronts. The injected material during fracturing can be supplied as a uniform material initially added to the proppant or a material that is integrated with the proppant. The pressure pulse can be generated explosively or by a reaction that is suitably delayed to allow placement in the borehole adjacent the fracture regime or in the fractures themselves. The electromagnetic signals are generated in the fractures and the pulse can also be initiated at this location.

The above description is illustrative of the preferred embodiment and many modifications may be made by those skilled in the art without departing from the invention whose scope is to be determined from the literal and equivalent scope of the claims below:

We claim:
1. A fracture mapping method, comprising:
   non-electrically generating at least one electromagnetic signal in subterranean fractures;
   sensing said signal;
   determining the extent of said fractures with said signal.
2. The method of claim 1, comprising:
   sensing said signal in spaced locations.
3. The method of claim 2, comprising:
   locating sensors in a borehole and on a surface location above said borehole for said sensing.
4. The method of claim 3, comprising:
   triangulating said sensors to determine the extent of the fractures.
5. A fracture mapping method, comprising:
   generating at least one electromagnetic signal in subterranean fractures;

sensing said signal;
determining the extent of said fractures with said signal;
using a pressure pulse to trigger said electromagnetic signal.

6. The method of claim 5, comprising:
creating said pressure pulse with explosives.

7. The method of claim 6, comprising:
creating said pressure pulse reactively with well fluids in the borehole.

8. The method of claim 5, comprising:
extending said fractures with said pressure pulse.

9. A fracture mapping method, comprising:
generating at least one electromagnetic signal in subterranean fractures;
sensing said signal;
determining the extent of said fractures with said signal;
using a piezoelectric material to trigger said signal.

10. The method of claim 9, comprising:
adding said piezoelectric material to proppant used to create said fractures at the outset of forming said fractures.

11. The method of claim 10, comprising:
adding piezoelectric material throughout the formation of said fractures.

12. The method of claim 9, comprising:
using a ferromagnetic material to trigger said signal.

13. The method of claim 9, comprising:
using lead zirconate titanate, lead zirconate niobate, lead manganese niobate, or/and lead lanthanum zirconate titanate as said piezoelectric materials.

14. A fracture mapping method, comprising:
generating at least one electromagnetic signal in subterranean fractures;
sensing said signal;
determining the extent of said fractures with said signal;
using a ferromagnetic or/and a ferrimagnetic material to trigger said signal.

15. The method of claim 14, comprising:
adding said ferromagnetic material to proppant used to create said fractures at the outset of forming said fractures.

16. The method of claim 15, comprising:
adding ferromagnetic material throughout the formation of said fractures.

17. The method of claim 14, comprising:
using as said magnetic materials elemental iron, nickel, cobalt, dysprosium, gadolinium, and alloys of said materials, chromium (IV) oxide, gallium manganese arsenide, magnetite, samarium-cobalt, neodymium-cobalt, yttrium iron garnets, spinels of the form $AB_2O_4$, where A and B represent various metal cations, comprising iron Fe, MnBi, EuO, $CrBr_3$, EuS, $MOFe_2O_3$, and/or other oxides of iron, cobalt, and nickel.

18. The method of claim 14, comprising:
using granular media with monomodal or multimodal distributions or layered constructions of one or more materials, elongated particles, hollow spheres or rods, platelets, fibers, and agglomerates thereof for the shape of said magnetic particles.

19. The method of claim 14, comprising:
using magnetic particle size ranges wherein the largest physical average dimension measured linearly is between 1 and 100 nanometers or from 100 nm to 500 nm, 500 nm to 1 micron, 1 micron to 10 microns, and/or particles or clusters in excess of 10 microns to 1000 microns, or particles and clusters between 1 mm and 10 mm.

* * * * *